(12) United States Patent
Nakamura

(10) Patent No.: US 6,938,212 B2
(45) Date of Patent: Aug. 30, 2005

(54) WEB COLLABORATION THROUGH SYNCHRONIZATION

(75) Inventor: Kohichi Nakamura, Machida (JP)

(73) Assignee: International Business Machines Corp., Armonk, NY (US)

( * ) Notice: Subject to any disclaimer, the term of this patent is extended or adjusted under 35 U.S.C. 154(b) by 586 days.

(21) Appl. No.: 09/999,300

(22) Filed: Oct. 31, 2001

(65) Prior Publication Data
US 2002/0083098 A1 Jun. 27, 2002

(30) Foreign Application Priority Data
Nov. 2, 2000 (JP) ........................................ 2000-336585

(51) Int. Cl.⁷ ................................................ G09G 5/00
(52) U.S. Cl. ........................ 715/748; 715/751; 715/752; 715/753; 715/759
(58) Field of Search ................................ 715/748, 751, 715/752, 753, 759; 709/204, 208, 213, 232, 227, 236; 345/738, 751, 752, 753, 754, 755, 759

(56) References Cited

U.S. PATENT DOCUMENTS

| 6,115,027 | A | * | 9/2000 | Hao et al. .................... 715/858 |
| 6,144,991 | A | * | 11/2000 | England ...................... 709/205 |
| 6,181,689 | B1 | * | 1/2001 | Choung et al. ............. 370/352 |
| 6,192,383 | B1 | * | 2/2001 | Cragun ........................ 715/513 |
| 6,212,192 | B1 | * | 4/2001 | Mirashrafi et al. .......... 370/401 |
| 6,230,171 | B1 | * | 5/2001 | Pacifici et al. .............. 715/512 |
| 6,487,195 | B1 | * | 11/2002 | Choung et al. ............. 370/352 |
| 6,584,493 | B1 | * | 6/2003 | Butler ......................... 709/204 |
| 6,687,878 | B1 | * | 2/2004 | Eintracht et al. ........... 715/512 |
| 6,732,145 | B1 | * | 5/2004 | Aravamudan et al. ...... 709/204 |
| 2002/0026478 | A1 | * | 2/2002 | Rodgers et al. ............. 709/205 |
| 2002/0065926 | A1 | * | 5/2002 | Hackney et al. ............ 709/231 |

FOREIGN PATENT DOCUMENTS

| JP | 07-105191 | 4/1995 |
| JP | 10-326274 | 12/1998 |

* cited by examiner

*Primary Examiner*—Ba Huynh
(74) *Attorney, Agent, or Firm*—Louis P Herzberg

(57) ABSTRACT

The present invention provides a collaboration technique for synchronizing display scrolling and the locations of remote pointers in the windows of web browsers, independent of the types and the setups of the web browsers. An example embodiment of an information processing system comprises: a collaboration server to be connected to a web server, and a plurality of terminals, for obtaining web content from the collaboration server and for performing a cooperative operation. Terminal devices includes a web browser for displaying web content, and obtains identification information for an object selected as a synchronization reference among objects in the web content, and transmits the information to the other terminal, with which it performs a cooperative operation. The terminal employs the identification information for a predetermined object that it receives, calculates the location of the pertinent object, and controls the web browser in accordance with the location of the object.

30 Claims, 17 Drawing Sheets

```
<BODY>
<h3><font size="5">
<A NAME="0"></A>Test.
<A NAME="1"></A>Test.
<A NAME="2"></A>Test.
</font></h3>
<HR>
<FORM NAME="Form">
<A NAME="3"></A>
TEXT FIELD:
<A NAME="4"></A>
<INPUT TYPE="TEXT"
NAME="TextTest"
SIZE=5>
<A NAME="5"></A>
<INPUT TYPE="BUTTON"
NAME="bTest"
VALUE="TEST">
</FORM>
</BODY>
```

Fig. 4

Marker object

PASSWORD:

1222

(A)

1211

PASSWORD:

The more companies provide web-based customer services, though, the more competitive becomes the recent business environment. The following are some of the problems addressed in today's e-business model.

Equations for calculating the center point

```
var centerX = pageX + (width/2);
var centerY = pageY + (height/2);
```

Fig. 14

Expression for selecting the marker nearest the center point

```
var vtgt  = -1;
var ltgt  = -1;
var vdist = 100000;
var ldist = 100000;
var cmp;
var cnt;
var len = anchors.length;

for (cnt=0; cnt<len; cnt++) {
    cmp = sqrt ( (centerX-anchorX[cnt])*(centerX-anchorX[cnt]) +
                 (centerY-anchorY[cnt])*(centerY-anchorY[cnt]) );
    if ( (cmp < vdist) &&
        ( (pageX <= anchorX[cnt]) && (pageY <= anchorY[cnt]) ) &&
        ( (pageX+width >= anchorX[cnt]) && (pageY+height >= anchorY[cnt]) ) ) {
        vtgt  = cnt;
        vdist = cmp;
    } if (cmp < ldist) {
        ltgt  = cnt;
        ldist = cmp;
    }
  }
}
```

Fig. 15

Expression for controlling scrolling so that
a marker is located nearest the center point

```
var xpos = anchorX - (width/2);
var ypos = anchorY - (height/2);
ScrollTo (xpos, ypos);
```

Fig. 16

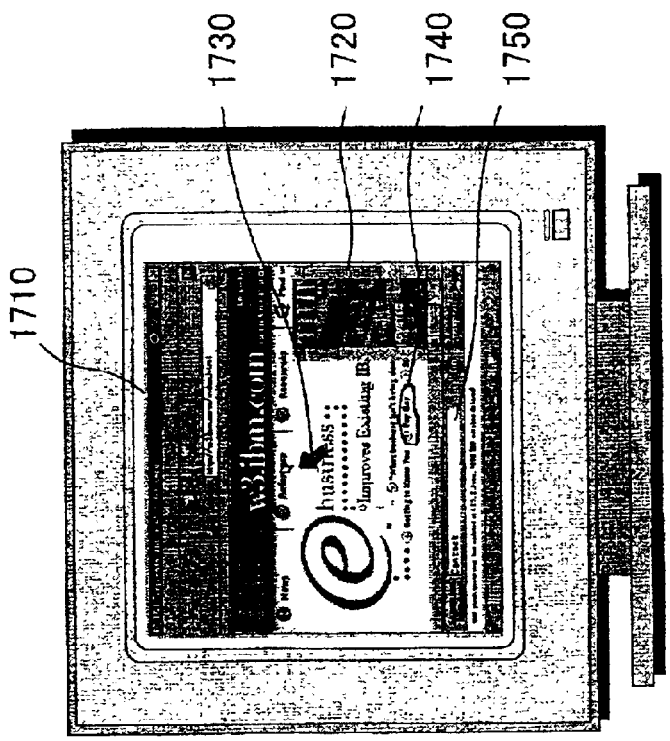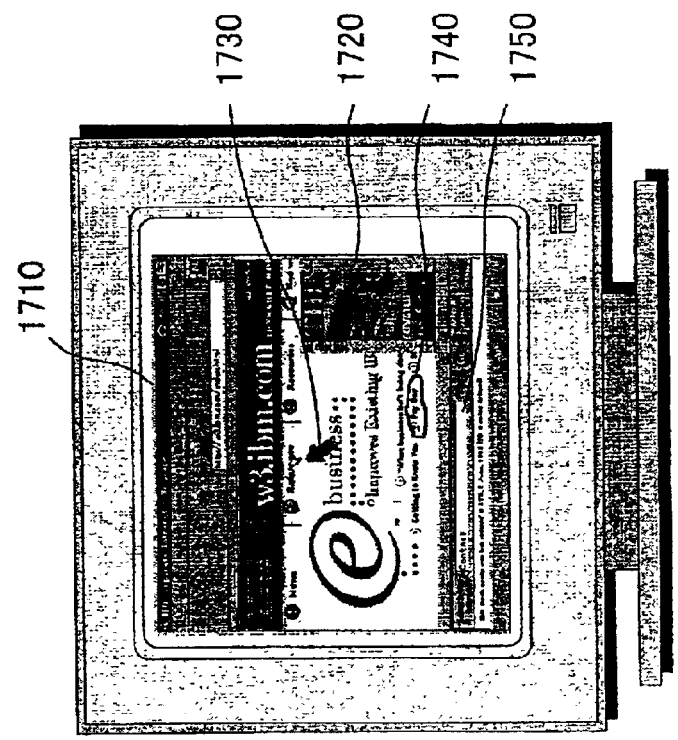
Fig. 17

WEB COLLABORATION THROUGH SYNCHRONIZATION

FIELD OF THE INVENTION

The present invention relates to web collaboration technique where web browsers at a plurality of terminals connected by a web-based network are synchronized for performance of a cooperative operation.

BACKGROUND ART

Recently, a collaboration technique has become popular whereby a plurality of terminal users on a web-based network, such as the Internet, perform a cooperative operation (browsing, moving or alteration) on a web page. FIG. 17 is a diagram for explaining a cooperative operation which is performed on web pages displayed by two terminals through collaboration technique. In FIG. 17, for terminals A and B, a window size and a displayed web page (its URL) are matched for web browser windows 1710 on display devices. Further, the display locations of scroll bars 1720 and remote pointers 1730 are also matched. The remote pointer 1730 is a pointer displayed for a cooperative operation, and when the remote pointer 1730 is moved by one terminal (e.g., terminal A), accordingly, the remote pointer 1730 displayed by the other terminal (e.g., terminal B) is moved.

Further, in FIG. 17, displays 1740, which are described as annotations, and the entries on input forms 1750 are matched. This means that an operation performed on one of the terminals A and B is reflected and displayed on the screen of the other terminal by synchronizing the web browsers of the terminals A and B. When, for example, the terminal of a customer and the terminal of an agent or operator are synchronized using this collaboration technique, and the customer and the agent write on the same web page, a service can be provided whereby the agent can cope with the request of the customer.

For conventional collaboration, absolute coordinates, for which the window 1710 of a browser is used as a reference, are employed to specify the synchronous locations of the scroll bar 1720 and the remote pointer 1730. That is, the display size of the window 1710 of the web browser is set in advance, and the locations of scroll bars 1720 and the remote pointers 1730 in the windows 1710 are matched between the terminals, so that the locations of the scroll bars 1720 and the remote pointers 1730 are synchronized.

This collaboration is implemented by using software that provides the collaboration (hereinafter referred to as collaboration software) required to synchronize a plurality of terminal devices that are engaging in a cooperative operation. The collaboration software includes software that is installed in advance in terminals that perform a cooperative operation, and software that is downloaded by each terminal before execution.

When the collaboration software to be installed in terminals in advance is employed, various setups for the individual terminals can be used in common. Therefore, it is easy for the displays in the windows 1710 of the web browsers to be matched. However, this type of collaboration software must be installed in advance for all the terminals engaging in a cooperative operation. This can be done easily when, for example, the cooperative operation is an intra-company event or is one that involves companies whereat a large number of users are to participate and predetermined terminal devices are to be employed, while it is difficult to provide the collaboration software for an unspecified number of individual users. This is because of the problems that will be encountered when individual users having different capabilities and knowledge levels are requested to install and setup the collaboration software.

The required collaboration software that must be downloaded to each terminal before a cooperative operation is prepared using Java applets or JavaScript, and for the event, must be downloaded from a server machine by a terminal. Therefore, since it is not necessary to install the collaboration software on a terminal device in advance, it is easy for each user to download and set up the software. Further, if the collaboration software is prepared in a form that is platform (operating system) and web browser independent, such as Java applets or JavaScript installing the collaboration software will be easier.

However, in this method, it is too difficult to do detailed setup work for the software and terminal devices, and the contents that can be synchronized are limited. Generally, conventional collaboration software of this type includes only a function for synchronizing the URLs of the web pages that are displayed by web browsers.

As is described above, the conventional collaboration technique employs absolute coordinates, for which only the window of a web browser is used as a reference, in order to synchronize scrolling and the locations of the remote pointers in windows. Thus, when different web browsers are employed by different terminal devices to be used for a cooperative operation, the display locations of the web pages and the locations of the remote pointers may not match because of differences in rendering methods. Further, even though the same web browser may be employed, when the font sizes and/or window sizes differ, accordingly, the sizes and locations of objects displayed in the windows of the web browsers will also differ from one terminal device to the other, so that the synchronization of scrolling and of the positioning of remote pointers will be impossible.

FIG. 18 is a diagram showing a state wherein the remote pointers 1730 point at different web page locations because font sizes differ, even though a common web browser and the same window size are employed. According to one of the conventional collaboration techniques by which collaboration software is installed in advance for terminal devices, setup items for a web browser can be common when the software is installed, so that scrolling and remote pointers can be synchronized, and the same locations are always pointed at on all web pages. In this case, however, if a user changes the setup items for the web browser, synchronization of the scrolling and of the remote pointers will not be possible, as is shown in FIG. 18. Therefore, an environment must be provided that a user can not easily alter.

According to the other conventional collaboration technique, whereby the downloading of collaboration software by a terminal device serves as a prelude to a cooperative operation, a user of a terminal device can arbitrarily set up a web browser; however, as is described above, since synchronization of the scrolling and of the remote pointers can not be obtained, a cooperative operation can be performed only for extremely limited contents.

SUMMARY OF THE INVENTION

It is, therefore, one aspect of the present invention to provide a collaboration technique for synchronizing the scrolling of display screens and the locations of remote pointers in the windows of web browsers, regardless of the type or the setup of the web browser.

It is another aspect of the invention to provide a collaboration technique, by which collaboration software is downloaded on a terminal device at the time of execution, for synchronizing the scrolling of display screens and the locations of remote pointers in the windows of web browsers.

To achieve the above aspects, in an example embodiment according to the invention, an information processing system (collaboration system) comprises: a support server (collaboration server) connected to a web server via a network; and a plurality of terminal devices for obtaining a web content from the web server through the support server, and for performing a cooperative operation by using the web content.

In the embodiment, each of the terminal devices includes: display means for displaying the web content obtained through the support server; information provision means for obtaining identification information for an object that is selected as a synchronization reference from among objects in the web content; and for transmitting the identification information to a different terminal device that performs the cooperative operation; and synchronization means for calculating the location of the predetermined object in the web content, based on identification information that is received from a different terminal device for the predetermined object to be used as a synchronization reference, and for changing the display screen employed for the web content based on the location of the predetermined object.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 4 is a diagram showing an example HTML document into which anchor objects are inserted as markers;

FIGS. 12A and 12B are diagrams showing an example wherein scrolling synchronization is performed in accordance with the occurrence of an event;

FIGS. 13A and 13B are diagrams showing a remote pointer synchronization example;

FIG. 14 is a diagram showing a JavaScript example for obtaining the position (coordinates) of the center point of a window (display area);

FIG. 15 is a diagram showing a JavaScript example for detecting the marker located nearest the center point of a window (display area);

FIG. 16 is a diagram showing a JavaScript example for exercising scroll control based on a marker;

FIG. 17 is a diagram for explaining the state wherein a cooperative operation for web pages displayed by two terminal devices is performed through collaboration.

DESCRIPTION OF THE SYMBOLS

Figure 1:
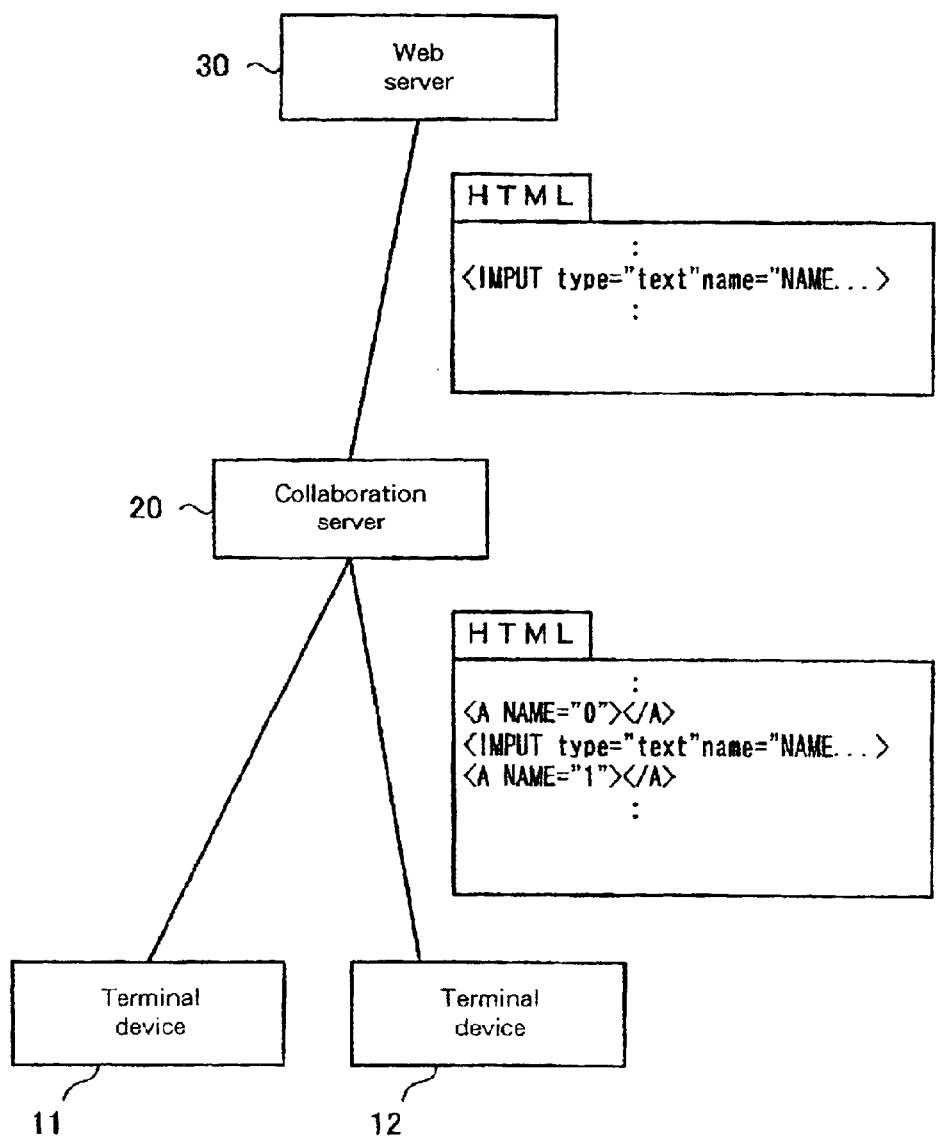
FIG. 1 is a diagram showing the system configuration for carrying out a collaboration according to one embodiment of the invention.

11, 12: Terminal device
20: Collaboration server
21: HTTP bridge
22: Session manager
23: Cashe manager
30: Web server
310: Web browser
320: Collaboration applet
801: Browser controller
802: Center point calculator
803: Cursor position calculator
804: Timer processor
805: Marker selector
806: Message preparation unit
807: Data communication unit
808: Message analyzer
809: Marker position calculator
810: Scroll controller
811: Remote pointer drawing unit

DESCRIPTION OF THE INVENTION

According to the present invention, an example of an information processing system (collaboration system) comprises: a support server (collaboration server) connected to a web server via a network; and a plurality of terminal devices for obtaining a web content from the web server through the support server, and for performing a cooperative operation by using the web content.

Generally, each of the terminal devices includes: display means for displaying the web content obtained through the support server; information provision means for obtaining identification information for an object that is selected as a synchronization reference from among objects in the web content; and for transmitting the identification information to a different terminal device that performs the cooperative operation; and synchronization means for calculating the location of the predetermined object in the web content, based on identification information that is received from a different terminal device for the predetermined object to be used as a synchronization reference, and for changing the display screen employed for the web content based on the location of the predetermined object.

Since the display contents are synchronized based on the location in web content of the object, a desired location can be defined as a synchronization reference, regardless of the type of display unit (web browser) or the setting of the display screen (the window of a web browser) used. The object used as the synchronization reference can be an object located near the center of the window of a web browser, an object that is correlated with a predetermined event, such as a mouse click, that is defined as an event that the user designates a specific object, or an object that is located near a mouse cursor manipulated by a pointing device serving as input means.

The synchronization means controls the display of a window, so that an object corresponding to the identification information received from the different terminal device is located near the center of the window of the web browser, or displays, at the location of the object, a pointer image used for a cooperative operation. As a result, synchronization with the terminal that has transmitted the identification information can be obtained.

For the information processing system described above, the support server further generally includes: storage means for storing a computer program that controls the operation of a terminal device when a cooperative operation is being performed, and the terminal device includes: web content acquisition means for obtaining a target web content for the cooperative operation through the support server; display means for displaying the web content obtained by the web content acquisition means; reception means for obtaining the computer program from the support server in order to participate in the cooperative operation; and cooperative operation means for performing a process required for the cooperative operation under the control of the computer program. Based on position information within the web content for an object that is selected as the synchronization reference from among objects in web content displayed by the display means, the cooperative operation means obtains synchronization of display screens with a different terminal device.

Furthermore, in an example embodiment, the support server includes: web content acquisition means for obtaining a web content from the web server, upon the receipt of a request from the terminal device, target web content for a cooperative operation; storage means for holding the web content; process means for adding an object used as the synchronization reference to the web content stored in the storage means; and communication means for returning to the terminal device the web content to which the object has been added. In this case, the web content acquisition means of the terminal device obtains, as a cooperative operation target, the web content to which the object has been added by the process means of the support server.

The object that the process means adds to the content can be an HTML object for which the coordinates in the web content are available. An anchor object can be especially employed as such an HTML object. When only the NAME attribute used as the identification information is designated by using the anchor object, a size 0 object having no elements can be included in the content, and a predetermined location in the content can be specified.

The terminal device of the invention may have a function for selecting the object used as a synchronization reference by the individual terminals, and a function for exercising synchronous control based on the location of the object. The terminal may be sorted into a transmission side terminal device that selects a marker object as a synchronization reference based on a predetermined operation and that transmits the identification information to a different terminal device, and a reception side terminal device that specifies the marker object based on the identification information received from the different terminal device and that exercises synchronous control based on the location of the object.

Specifically, the terminal device on the transmission side comprises: a display unit for displaying predetermined content; a marker selector for selecting a marker object as a synchronization reference from among objects in the content displayed on the screen of the display unit, and for obtaining identification information for the marker object; and a data transmitter for transmitting, to the different terminal device, the identification information for the marker object obtained by the marker selector.

The reception side terminal device includes: a display unit for displaying a predetermined content; a data receiver for receiving identification information for a predetermined object in the content received from the different terminal device; a marker position calculator for calculating the location in the content of the object that corresponds to the identification information received by the data receiver; and a synchronization controller for controlling the screen of the display unit based on the location of the object obtained by the marker position calculator.

According to another example embodiment of the present invention, a method for displaying the same web page on display devices of a plurality of terminal devices, and for synchronizing the display screens of the display devices, comprises the steps of: selecting an object that is used as a synchronization reference for a predetermined terminal device; transmitting identification information for the selected object to a different terminal device; and controlling the display screens of the display devices based on the location of the object that corresponds to identification information received by the different terminal device.

According to the invention, a storage medium is provided on which a computer-readable program is stored, which permits the computer to perform: a process for receiving, from a predetermined terminal device, identification information for specifying an object on a web page displayed by a display device of the computer; a process for calculating the location, on the web page, of an object that corresponds to the received identification information; and a process for controlling the display screen of the display device based on the obtained location of the object, and for synchronizing the display screen for the display device of the terminal device that has transmitted the identification information.

Furthermore, according to the invention, a storage medium is provided on which a computer-readable program is stored, which permits the computer to perform a process for obtaining position information for a predetermined target on the display screen of the display device of the computer; a process for selecting as a synchronization reference an object that, based on the position information, is located near the target; and a process for transmitting to another computer identification information for the object selected as the synchronization reference. An arbitrary target, such as the center point of the display screen (the window of a web browser) or a mouse cursor, can be set as the synchronization reference.

Further, in the present invention, this program can be stored in the storage means of the support server, and can be provided upon the receipt of a downloading request from the terminal device.

Advantageous embodiments of the invention will now be described in detail while referring to the accompanying drawings. An overview of the invention will now be given. In this invention, based on the relative location of an object on a web page, the locations for scrolling and for a remote pointer in the window of a browser are synchronized.

To control the synchronization, a marker is set to specify the location of an object on a web page. When the marker is employed to specify the relative location of the object on the web page that is displayed by the web browser, synchronization can be obtained without depending on the type or setup of the web browser. It is recommended that, even when this marker is displayed by a different web browser, the commonly used coordinates for the marker can be obtained, and that the layout of the content be deteriorated as little as possible.

FIG. 1 is a diagram showing the system configuration for carrying out a collaboration operation according to the embodiment. In this embodiment, the system for downloading collaboration software to a terminal device at the time of execution of a cooperative operation is employed. It should be noted that the invention can also be applied for a system for installing collaboration software in advance in a terminal device.

In the example of FIG. 1, the collaboration system for this invention comprises: terminal devices 11 and 12, for performing a cooperative operation; a collaboration server 20, for supporting the cooperative operation of the terminal devices 11 and 12; and a web server 30, for providing a web page for which the cooperative operation is performed. The terminal devices 11 and 12, the collaboration server 20 and web server 30 are interconnected via a web-based network, such as the Internet.

In the collaboration system in FIG. 1, when the terminals 11 and 12 access the collaboration server 20 to perform a cooperative operation, the collaboration software can be downloaded from the collaboration server 20 to the terminals 11 and 12, and the cooperative operation can be performed on the web page obtained by the web server 30. Further, initially the terminal devices 11 and 12 directly access the web server 30 and obtain a web page, but for the cooperative operation, the web page that the collaboration server 20 obtains from the web server 30 is employed to the terminals. The collaboration server 20 can perform a process for supporting a cooperative operation for a web page held therein.

Figure 2:
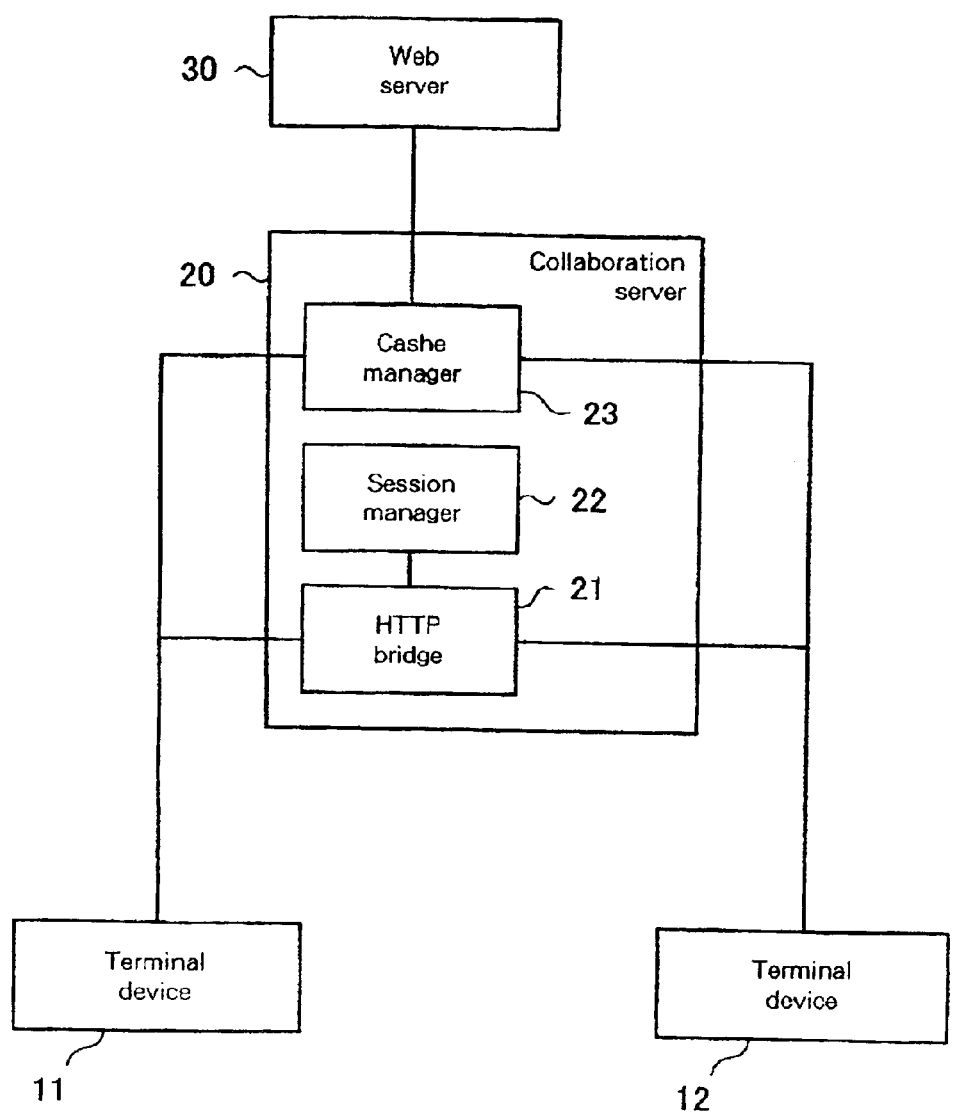
FIG. 2 is a diagram showing the system configuration of a collaboration server according to the embodiment.

FIG. 2 is a diagram showing an example of a system configuration of the collaboration server 20 according to the embodiment. As is shown in FIG. 2, the collaboration server 20 includes an HTTP bridge 21, a session manager 22 and a cashe manager 23. The HTTP bridge 21 is connected to the session manager 22 by a socket to support communication between the web browsers of the terminal devices 11 and 12. The session manager 22 identifies a pair of terminal devices 11 and 12 that perform a cooperative operation, and manages the cooperative operation (session). Upon the receipt of a request from the terminals 11 and 12, the cashe manager 23 obtains and holds a web page from the web server 30. Then, the cashe manager 23 embeds, in the web page, an applet or a script that is required for the cooperative operation. The terminal devices 11 and 12 each obtain a web page from the cashe manager 23 of the collaboration server 20, and perform the cooperative operation for the obtained web page.

Figure 3:
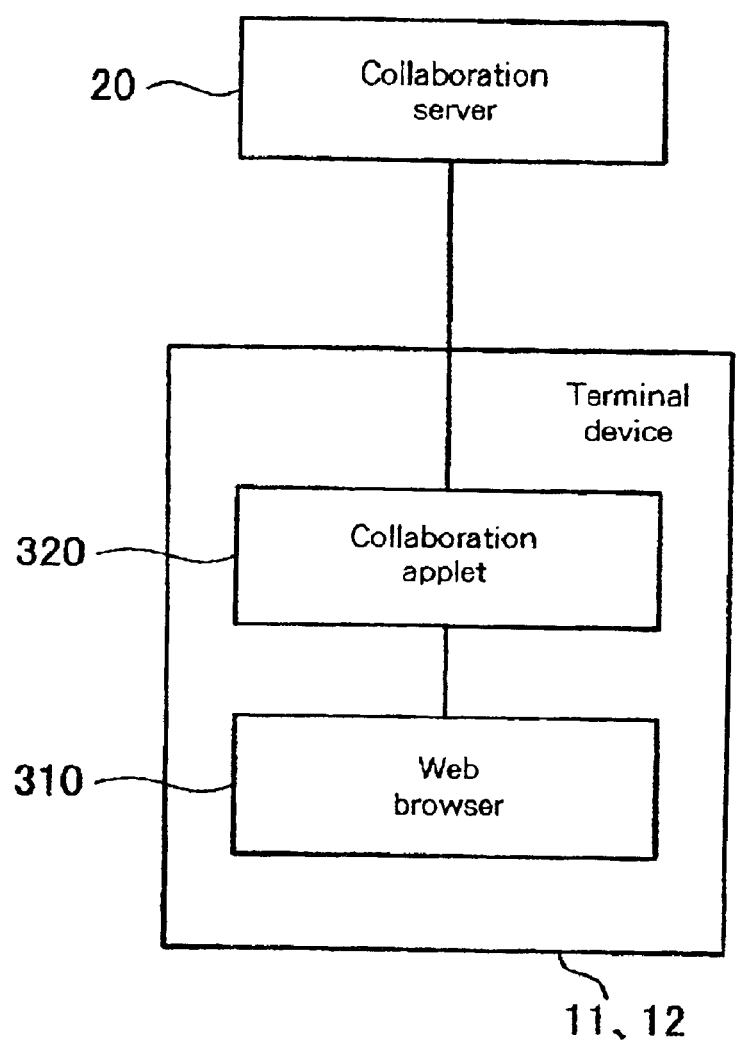
FIG. 3 is a diagram for explaining the system configuration of a terminal device according to the embodiment.

FIG. 3 is a diagram for explaining an example of a system configuration of the terminal devices 11 and 12 of the embodiment. As is shown in FIG. 3, the terminal devices 11 and 12 each include a web browser 310 for obtaining and displaying a web page, and a collaboration applet 320, for controlling the web browser 310 and for enabling a cooperative operation by connecting to the collaboration server 20. The collaboration applet 320 performs various processes for implementing the cooperative operation. For example, the structure of an HTML document in a target web page for the cooperative operation is managed, or communication with another terminal device that performs the cooperative operation is controlled. Since the collaboration applet 320 is prepared as a Java applet, this need not be installed in the terminals 11 and 12 in advance. The collaboration applet 320 is stored in the collaboration server 20, and at the time of execution of the cooperative operation, the web browsers 310 of the terminals 11 and 12 download the applet 320 from the collaboration server 20.

The terminal devices 11 and 12 are data processors, each of which include a display device, for displaying a web page by using the web browser 310, and a CPU, for performing the cooperative operation (acceptance of input, a calculation process, display control or communication control) in the web page displayed on the display device. Specifically, the terminal devices 11 and 12 can be implemented, for example, by a computer system, such as a personal computer or a work station, an electric home appliance, such as a computer-incorporating television set, or a PDA.

The collaboration system in FIG. 1 can be used with an arrangement whereby, for example, a customer and a company agent perform a cooperative operation in a customer service center by referring to the same web page. In this case, the terminal device of the customer is defined as the terminal device 11, and the terminal device of the agent is defined as the terminal device 12, which along with the web server 30 is installed on the company side.

The collaboration server 20 may be installed on the company side or by an independent service provider. For the second case, the collaboration server 20 is connected to a plurality of web servers 30, and when an arbitrary web server 30 is accessed via the collaboration server 20, the cooperative operation can be performed for the web page of a desired web server 30.

The collaboration system in FIG. 1 can also be used with an arrangement whereby, for a predetermined group wherein it is presumed that a cooperative operation will be performed by a plurality of terminals 11 and 12, a collaboration server 20 that also functions as a proxy server is located between the terminals 11 and 12 and the external web server 30.

In this embodiment, the HTML tag is used as a marker that is set on a web page in order to specify the location of an object on the web page. Specifically, an anchor object can be used for this embodiment, while taking into account the fact that the common coordinates can be used, even when the object is displayed by a different web browser, and that the layout of the content is deteriorated as little as possible.

Since only the NAME attribute is designated by using the anchor tags (<A> and </A>), a size 0 object (hereinafter referred to as a marker object) can be placed at a predetermined location. The coordinates for this marker object can be obtained by using JavaScript. Therefore, the location of the marker object set by the anchor tags can be obtained using JavaScript, and can be used for the synchronization of scrolling and of remote pointers, which will be described later. The NAME attribute serves as an identifier (anchor ID) for an anchor object used as a marker.

The location for setting the marker object can be arbitrarily determined, such as before or after the Form object, before or after a paragraph, or before or after a sentence. If the marker object is placed at many locations, more detailed position information can be obtained from the web page, so that accurate positioning for scrolling and remote pointers can be performed to obtain synchronization.

Figure 5:
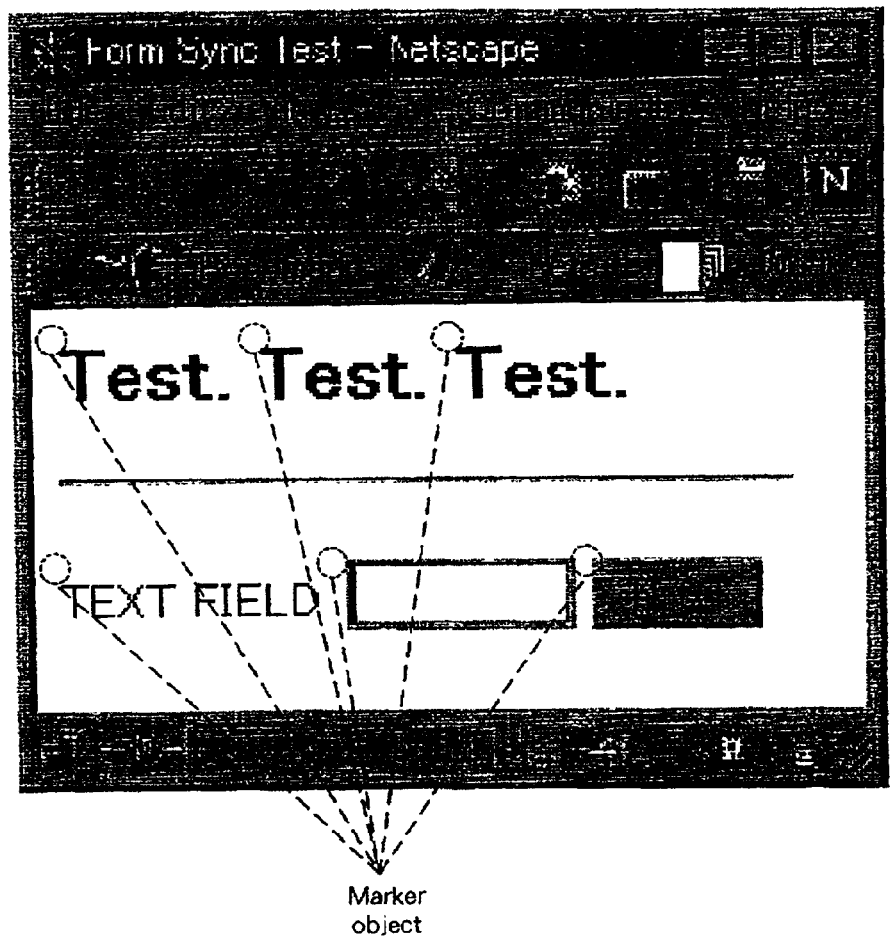
FIG. 5 is a diagram showing the HTML document in FIG. 4 displayed by a web browser.

FIG. 4 is a diagram showing an example HTML document into which anchor objects are inserted as markers, and FIG. 5 is a diagram showing the screen on which the HTML document in FIG. 4 is displayed by a web browser. In FIG. 4, six anchor objects that designate only the NAME attribute, <A NAME="*"></A>(in FIG. 4, *=0, 1, 2, 3, 4, 5), are markers. When the HTML document is displayed by a web browser, in accordance with the markers inserted into the HTML document in FIG. 4, size 0 marker objects are placed at six locations indicated by circles in FIG. 5. That is, the upper left corners of six objects, i.e., three "Test." texts, the "TEXT FIELD" text, an input form and a button, are the locations of the marker objects. Since the marker objects are prepared as described above by the anchor tags, the coordinates of the individual locations can be obtained by JavaScript. Thus, as is shown in FIGS. 4 and 5, when the coordinates of the marker object located near a desired object are obtained, the locations of the individual objects can be identified.

Further, since the size of the marker object is 0, the layout when the HTML document is displayed by a web browser is the same as the layout when there is no marker. The marker can be added to the HTML document when a web page to be stored in the web server 30 is prepared, or can be added by the cashe manager 23 of the collaboration server 20. That is, when the web page is stored by the cashe manager 23 in order to perform a cooperative operation, the HTML document of the pertinent web page is analyzed, and necessary markers (anchor tags) are inserted. While referring to FIG. 1, it is understood that the markers are added by the collaboration server 20 before and after the input form (<INPUT type="text"name="NAME , . . . >) of the HTML document obtained from the web server 30.

Figure 6:
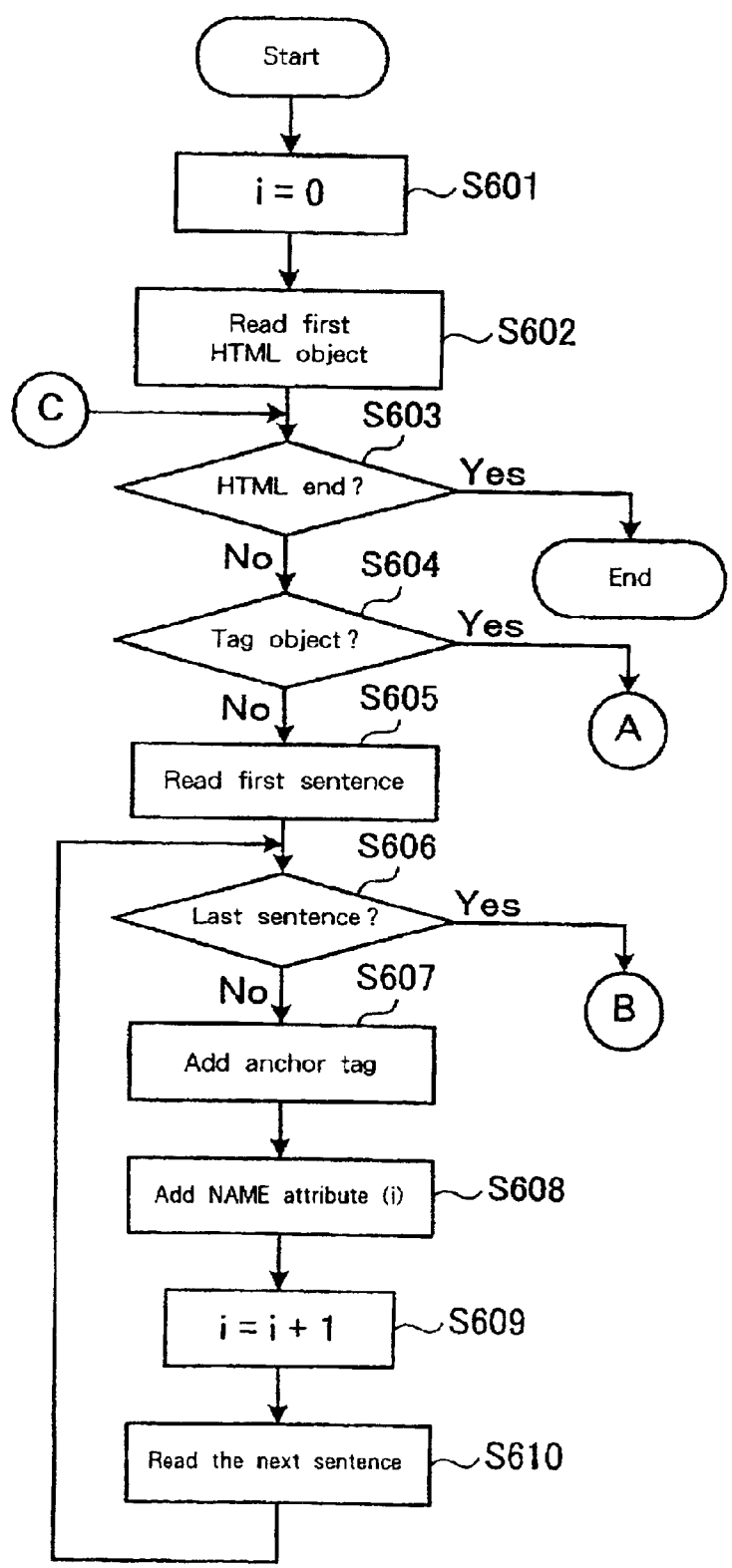
FIG. 6 is a flowchart for explaining the processing in which the cashe manager of the collaboration server inserts anchor objects into an HTML document as markers.
Figure 7:
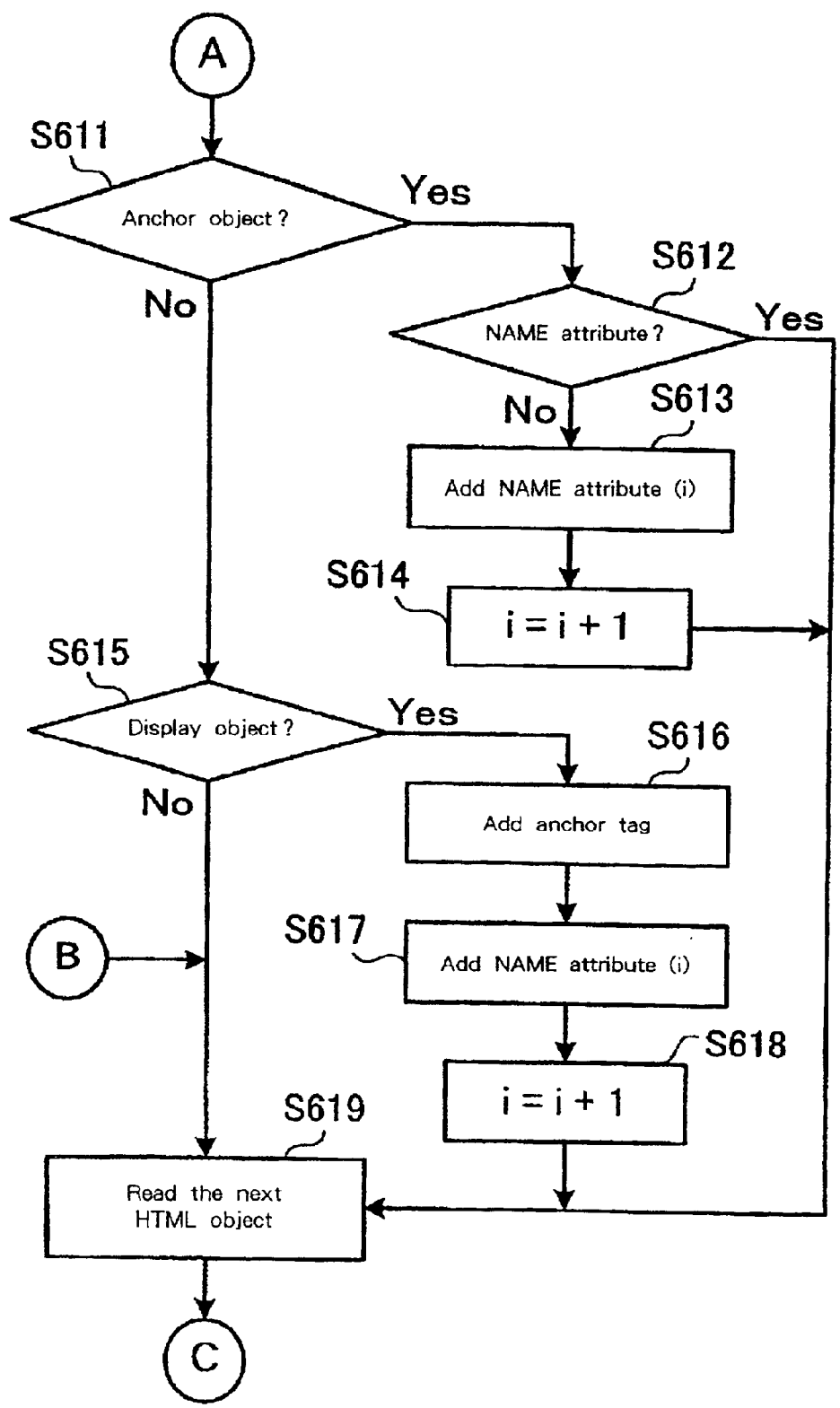
FIG. 7 is a flowchart for explaining the processing in which the cashe manager of the collaboration server inserts anchor objects into an HTML document as markers.

FIGS. 6 and 7 are flowcharts for explaining processing in which the cashe manager 23 of the collaboration server 20 inserts anchor objects into the HTML document as markers. In FIGS. 6 and 7, first, the value of constant i used for identifying the NAME attribute is defined as 0 (step 601 in FIG. 6), and then the first HTML object in an HTML document to be processed is read (step 602). When the end of the HTML document is not reached, a check is performed to determine whether the obtained HTML object is a tag object (steps 603 and 604). When the HTML object is not a tag object, the first sentence following the HTML object is read (step 605). The sentence to be read can be extracted from the HTML document, while a portion from a character following a predetermined period (.) and continuing to the next period (.) is regarded as one sentence. A check is performed to determine whether the sentence that is read is the last sentence controlled by using the HTML object (step 606). If the sentence is not the last sentence, an anchor tag is added to this sentence (step 607). The NAME attribute is added to the anchor tag (step 608), the value of the constant i for the NAME attribute is incremented by one (step 609), and the next sentence is read (step 610). The process from step 607 to step 610 is repeated until the last sentence controlled by the HTML object is reached (step 606). When the last sentence controlled by the HTML object read at step 602 is reached, the next HTML object is read (step 619 in FIG. 7), and program control returns to step 603.

When at step 604 the HTML object read at step 602 is a tag object, a check is performed to determine whether the tag object is an anchor object (step 611 in FIG. 7). When the tag object is an anchor object, a further check is performed to determine whether the anchor object includes the NAME attribute (step 612). If the NAME attribute is not included, the NAME attribute is added to the anchor object (step 613), and the value of the constant i for the NAME attribute is incremented by one (step 614). When, at step 612, the anchor object includes the NAME attribute, or following steps 613 or 614, the next HTML object is read (step 619). Thereafter, program control returns to step 603.

When it is ascertained at step 611 that the tag object is not an anchor object, a check is performed to determine whether the tag object is a display object (step 615). When the tag object is a display object, an anchor tag is added to this object (step 616). Then, the NAME attribute is added to the anchor tag (step 617), and the value of the constant i for the NAME attribute is incremented by one (step 618). When, at step 615, the tag object is not a display object, or following steps 616 to 618, the next HTML object is read (step 619) and program control returns to step 603. The above processing is performed each time the HTML object is read, and when the end of the HTML document is reached, the processing is terminated (step 603).

Through the above processing, for the HTML document that is to be processed (the HTML document stored in the collaboration server 20), an anchor object is added to the sentence and the display object as a marker. Further, anchor objects originally written in the HTML document are rewritten, so that they can be used as markers.

Figure 8:
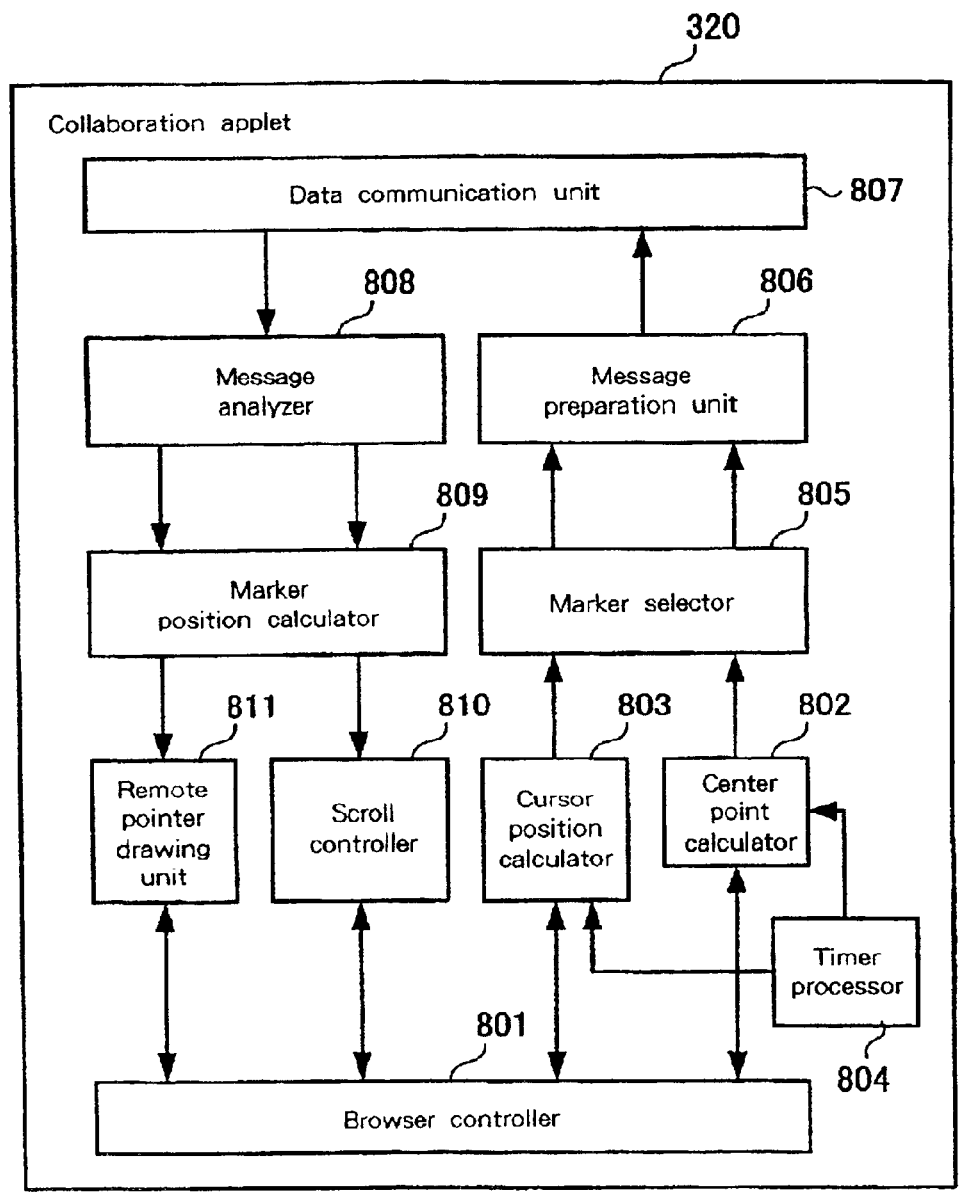
FIG. 8 is a diagram showing the arrangement of a collaboration applet that carries out scrolling synchronization and remote pointer synchronization.

An explanation will now be given for the scrolling synchronization and the remote pointer synchronization that are carried out for the example embodiment. FIG. 8 is a diagram showing the configuration of the collaboration applet 320 for performing the scrolling synchronization and the remote pointer synchronization according to the embodiment. In FIG. 8, the collaboration applet 320 comprises: a browser controller 801, a center point calculator 802, a cursor position calculator 803, a timer processor 804, a marker selector 805, a message preparation unit 806, a data communication unit 807, a message analyzer 808, a marker position calculator 809, and a scroll controller 810 and a remote pointer drawing unit 811 that together constitute a synchronization controller.

It should be noted that this configuration constituted by the components of the collaboration applet 320 is merely an example of how to perform the scrolling synchronization and the remote pointer synchronization for this embodiment. Actually, the collaboration applet 320 further comprises: a tree manager, for analyzing and managing the structure of a target web page for the cooperative operation (the tree structure of the HTML document), and a controller for controlling log-ons for the cooperative operation.

With the configuration in FIG. 8, the browser controller 801, the center point calculator 802, the cursor position calculator 803, the timer processor 804, the marker selector 805, the message preparation unit 806 and the transmission function of the data communication unit 807 are information provision means for providing, for a different terminal, information (identification information for a marker) that is used as a synchronization reference, so that the state of the web browser 310 of the different terminal device is synchronized with the display condition of the web browser 310 of the local terminal device.

The reception function of the data communication unit 807, the message analyzer 808, the marker position calculator 809, the scroll controller 810, the remote pointer drawing unit 811 and the browser controller 801 are synchronization means for synchronizing the display state of the web browser 310 based on the information that is received as the synchronization reference from the different terminal device. These components are virtual software blocks implemented by a CPU that is controlled by a Java applet (the collaboration applet 320), which is a computer program. As is described above, the Java applet for controlling the CPU is provided by being transmitted via a network by the collaboration server 20.

When the method for installing the collaboration software in the terminal device in advance is employed, a computer program that carries out the above configuration can be provided storing it on a storage medium, such as a CD-ROM or a floppy disk. With the configuration, the browser controller 801 controls the web browser 310 mounted in the terminal device 11 or 12 to exercise display control or to extract an event.

The center point calculator 802 calculates the position of the center point, which is used for scrolling synchronization, of a window displayed by the window browser 310. When the coordinates of the position of the center point are (centerX, centerY), the position of the center point can be calculated by executing the JavaScript in FIG. 14. The cursor position calculator 803 employs the onMouseMove event handler to obtain the position of a mouse cursor that is used for remote pointer synchronization. The timer processor 804 counts the time required to periodically perform the operations of the center point calculator 802 and the cursor position calculator 803. The marker selector 805 employs the position of the center point obtained by the center point calculator 802, or the position of the mouse cursor obtained by the cursor position calculator 803 to select a marker that is used as a reference for scrolling synchronization or remote pointer synchronization. Information for determining whether the selected marker is a reference for scrolling synchronization or for remote pointer synchronization can be added to the selected marker. The marker selector 805 can employ a method and information used for selecting a marker to determine which synchronization process the selected marker is used as a reference for, scrolling synchronization or remote pointer synchronization.

The message preparation unit 806 prepares a message in order to report to the terminal device 11 or 12 with which a cooperative operation is performed the identification information for the marker selected by the marker selector 805. The message also includes identification information indicating that the marker is to be used for scrolling synchronization or remote pointer synchronization.

The data communication unit 807 transmits, to the terminal device 11 or 12 with which the cooperative operation is performed, the message created by the message preparation unit 806. Further, the data communication unit 807 receives from the terminal device 11 or 12 a message that it transmits to the message analyzer 808.

The message analyzer 808 analyzes the message received from the data communication unit 807, and extracts identification information for a marker that is used as a reference for scrolling synchronization or for remote pointer synchronization.

The marker position calculator 809 calculates the position of a marker designated based on the identification information that is extracted by the message analyzer 808. Further, the marker position calculator 809 examines the identification information indicating whether the marker is used for scrolling synchronization or for remote pointer synchronization. When the marker is a reference used for scrolling synchronization, the position information for the marker is transmitted to the scroll controller 810. When the marker is a reference used for the remote pointer synchronization, the position information of the marker is transmitted to the remote pointer drawing unit 811.

The scroll controller 810 scrolls the display in the window of the web browser 310 in accordance with the position information for the marker obtained by the marker position calculator 809, and performs a synchronization process.

The remote pointer drawing unit 811 controls the display location of the remote pointer displayed in the window of the web browser 310 in accordance with the position information for the marker obtained by the marker position calculator 809, and performs the synchronization process.

An explanation will now be given, by referring to a specific example, for the scrolling synchronization and the remote pointer synchronization performed by the collaboration applet 320. In the following explanation, as an example, the operation of the terminal device 11 is to be synchronized with the operation of the terminal device 12. Specifically, the terminal device 12 is a transmission side terminal device that, based on a predetermined operation, selects a marker object as a synchronization reference, and transmits identification information to the terminal device 11. The terminal device 11 is a reception side terminal device that identifies a marker object based on the identification information received from the terminal device 12, and performs synchronization control based on the location of the marker object.

Figure 9:
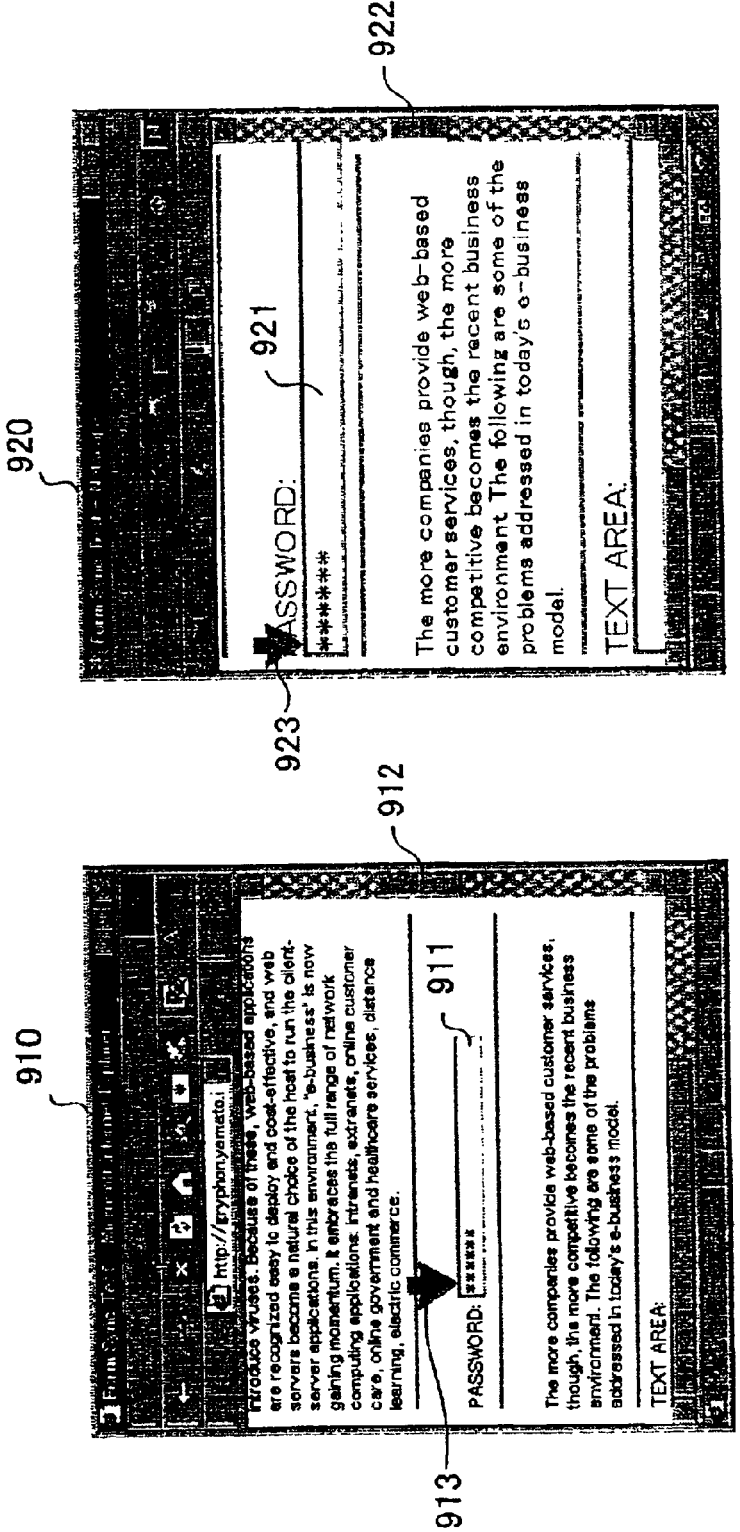
FIG. 9 is a diagram showing an example wherein scrolling synchronization and remote pointer synchronization have been performed for the input form "PASSWORD"

FIG. 9 is a diagram showing an example wherein scrolling synchronization and remote pointer synchronization are performed for input form "PASSWORD". It should be noted that in this example a marker is located at the upper left corner of the input form (display object). In FIG. 9, two different types of web browsers 910 and 920 are displayed (one is the Internet Explorer by MicroSoft Corp., and the other is the Netscape Navigator by Netscape Communications Corp.), and the display sizes of the fonts used differ. However, since the input forms are synchronized by using, as a reference, the locations of marker objects located near input forms 911 and 921, i.e., in accordance with locations relative to the windows of the web browsers 910 and 920, the input forms 911 and 921 are displayed in the windows of the web browsers 910 and 920. In addition, scroll boxes 912 and 922 for the scroll bars in the windows of the web browsers 910 and 920 are located substantially at the same positions.

Remote pointers 913 and 923 displayed by the wed browsers 910 and 920 point respectively at the upper left corners of the input forms 911 and 921, although the locations of the remote pointers 913 and 923 in the windows differ. Therefore, it is found that the remote pointers 913 and 923 are synchronized with each other based on the layout of the web page, i.e., at the locations relative to the windows of the web browsers 910 and 920 (since the font sizes differ, the display size of the window relative to the size of the web page also differs, so that the scroll boxes 912 and 922 have different sizes).

The operation for the scrolling synchronization and for the remote pointer synchronization will now be independently described in detail. Assume that, when the terminal devices 11 and 12 have loaded a web page from the collaboration server 20, the terminals 11 and 12 employ JavaScript to search for all the anchor objects included on the web page, and store their identifiers (NAME attribute values) and coordinates in the content.

First, scrolling synchronization will be explained. For scrolling synchronization, the scrolling of the display in the window of the web browser is controlled relative to the location of the marker object that is used as a reference. Specifically, two methods are employed together: a method for synchronizing, by performing periodical checks, the positions of markers located near the center position in the window of the web browser, and a method whereby, upon the occurrence of an event during which the user of the terminal device 12 focuses on a predetermined object, the display in the window of the web browser of the terminal device 11 is controlled in accordance with the pertinent event. The JavaScript code and the event handler required for synchronization can be embedded in the web page by the collaboration server 20.

Figure 10:
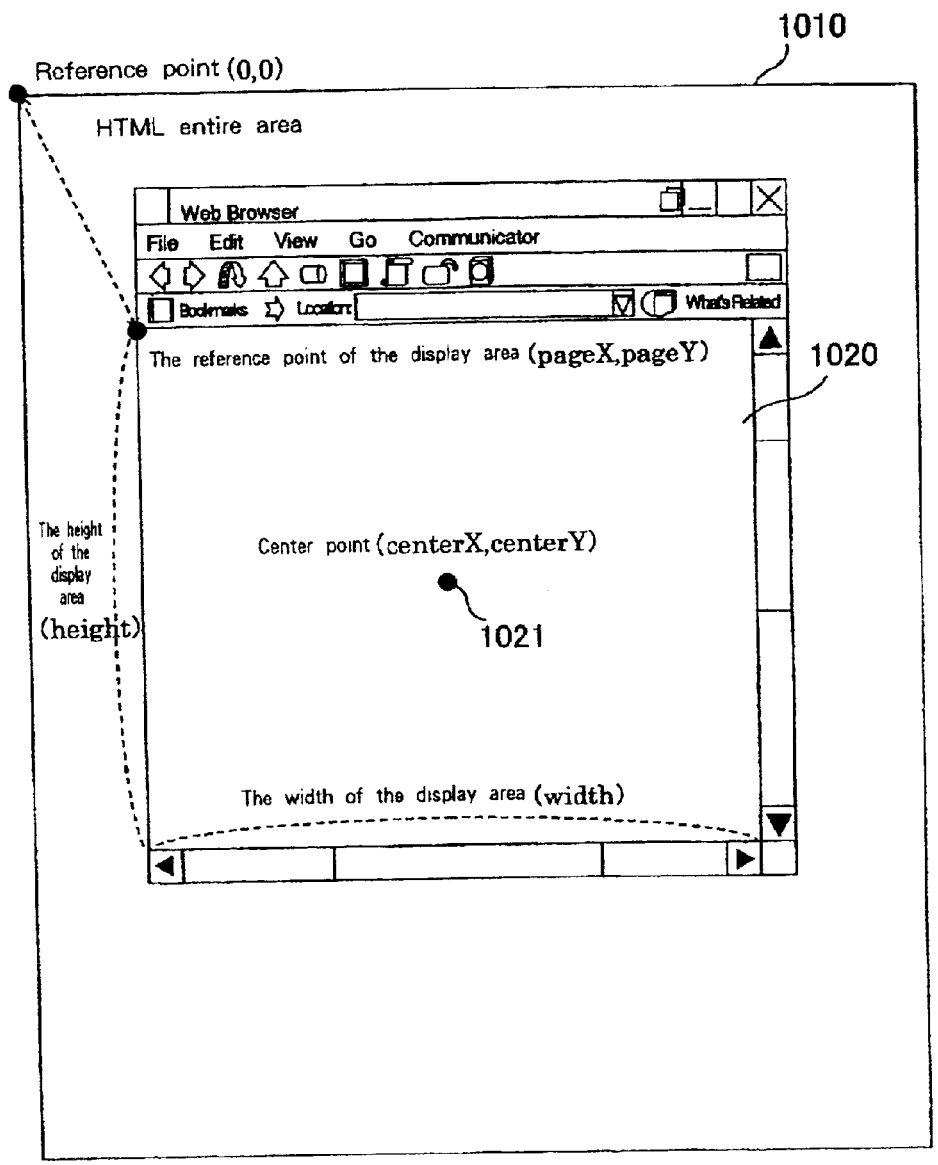
FIG. 10 is a diagram for explaining the relationship between the overall area of a web page and a display area provided by a web browser.

The relationship between the overall area of the web page and the display area provided by the web browser will now be described. FIG. 10 is a diagram for explaining the relationship of these two areas. Normally, the size of a web page (hereinafter referred to as a page size) does not always match the size of the window (hereinafter referred to as a window size) of a web browser. Therefore, when the page size is larger than the window size, only one part of a web page 1010 is displayed in the window, and the portion that is displayed in the window is called a display area 1020. Therefore, the display area 1020 and the window (the portion exclusive of a title bar and a menu bar) match in size and shape.

The location of the object on the web page 1010 is represented using coordinates for which the upper left corner of the web age 1010 serves as a reference point (coordinate value (0, 0)). In the following explanation, in the display area, the upper left corner is defined as a reference point (display area reference point), the coordinate value of the reference point on the web page 1010 is defined as (pageX, pageY), the height of the display area is defined as "height" and the width thereof is defined as "width".

According to the method used for obtaining scrolling synchronization by performing periodical checks, for the terminal device 12, the collaboration applet 320 center point calculator 802, the timer processor 804 and the marker selector 805 are employed to periodically detect a marker that is located nearest a center point 1021 of the display area 1020. The coordinates of the center point 1021 can be calculated by executing the JavaScript in FIG. 14. Furthermore, the marker (anchor object) nearest the center point 1021 can be detected by executing the JavaScript in FIG. 15.

When, as the result of this periodical detection process, a marker different from the previously detected marker is obtained as the marker nearest the center point 1021, it is found that the display in the window of the web browser has been scrolled, and the display area 1020 on the web page 1010 has been moved. Thus, the message preparation unit 806 obtains the identifier (the NAME attribute of the anchor tag) of the newly detected marker, prepares a notification message, and transmits it to the terminal device 11 via the data communication unit 807.

Upon the receipt of the message from the terminal device 12, the message analyzer 808 of the terminal device 11 analyzes the message, extracts the identifier of the marker that is used as a synchronization reference, and transmits the identifier to the marker position calculator 809. The marker position calculator 809 then calculates the position information for the marker designated by the identifier, and transmits the position information to the scroll controller 810. Thereafter, the scroll controller 810 scrolls the display in the window by using the position information for the marker, which is received from the marker position calculator 809, and the position information for the center point 1021, which is obtained by the center point calculator 802, and moves the marker as near as possible to the center of the window (the display area 1020) of the web browser of the terminal device 11. The scrolling of the display in the window can be controlled, for example, by executing the JavaScript in FIG. 16.

Through the above processing, the markers in the terminal devices 11 and 12 are located at the same positions near the centers of the windows of the web browsers, regardless of the web browser type and of the settings used for the window sizes and the font sizes. Therefore, the contents displayed in the windows are substantially matched.

Figure 11:
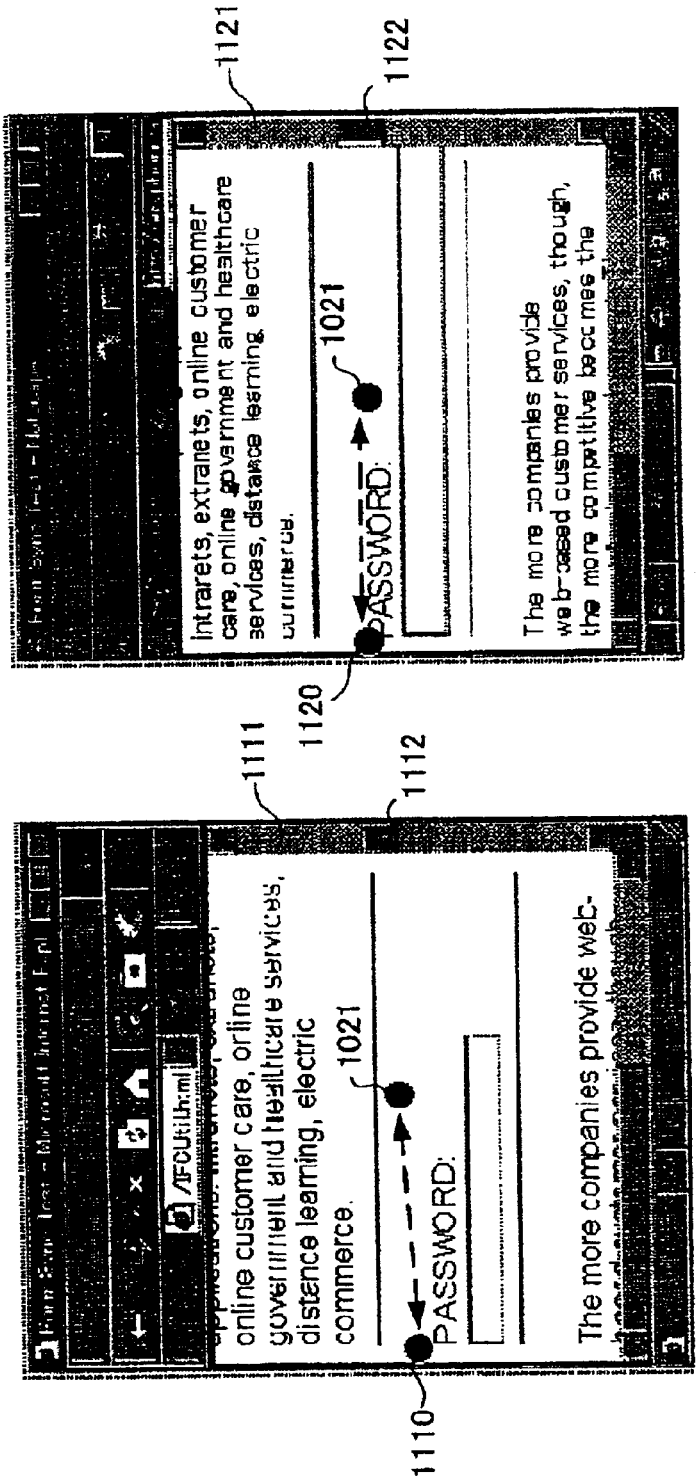
FIGS. 11A and 11B are diagrams showing an example wherein scrolling synchronization is performed using the marker located nearest the center point in the window of a web browser.
Figure 18:
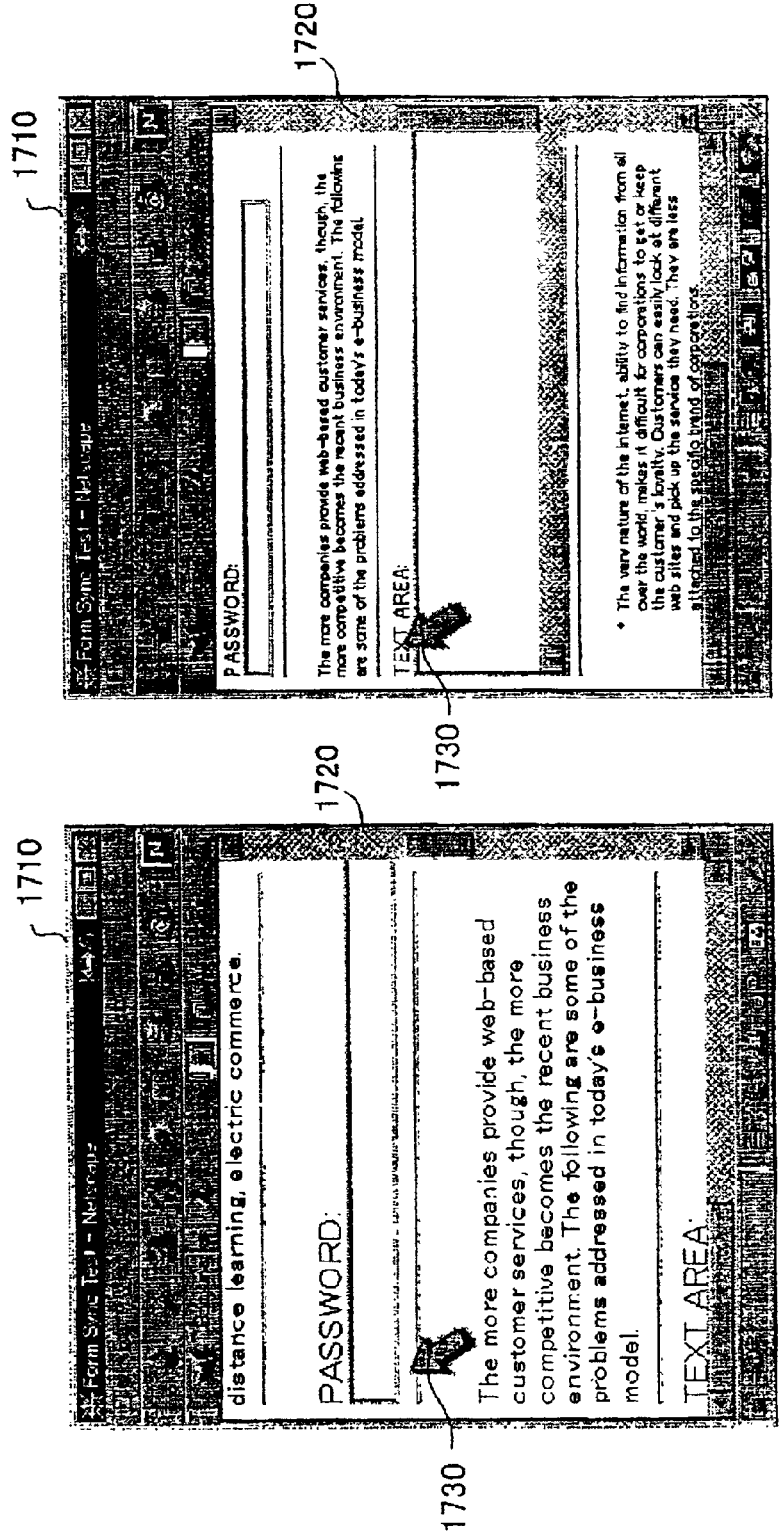
FIG. 18 is a diagram for explaining the state wherein scrolling synchronization and remote pointer synchronization are not obtained by a conventional collaboration technique.

FIGS. 11A and 11B are diagrams showing an example wherein scrolling synchronization is performed using the marker located nearest the center point of the window of the web browser. In FIG. 11A a web browser is shown that has performed the scrolling synchronization, and in FIG. 11B a web browser is shown that is operated in synchronization with the operation of the web browser in FIG. 11A. In FIGS. 11A and 11B, the marker in FIG. 11A, which is located nearest the center point 1021 of the window of the web browser, is a marker object 1110 present at the upper left corner of the text "PASSWORD". The NAME attribute (identifier), which is written to the anchor tag that is the marker for this object, is transmitted to the web browser in FIG. 11B. The web browser in FIG. 11B employs the NAME attribute received from the web browser in FIG. 11A to specify the marker object 1120 located at the upper left corner of the text "PASSWORD", and the marker object 1120 is moved to the location (the location exactly horizontal to the center point 1021) nearest the center point 1021 of the window of the web browser in FIG. 11B. As a result, scroll boxes 1112 and 1122 of scroll bars 1111 and 1121 are located substantially at the same positions. In FIG. 11, the circles (●) are shown to indicate the marker objects 1110 and 1120. However, since as is described above, the size of zero can be used for the marker object if the anchor object is used, this circle mark is not displayed on the actual window. The same thing can be applied for marker objects in FIGS. 12 and 13. Further, for the convenience in the explanation, the circle (●) is also used to represent the center point 1021; however, again, this is not displayed in the actual window.

According to the method for obtaining the synchronization in accordance with an event, when the user manipulates the terminal device 12 to focus on a predetermined object (e.g., the user clicks on a button and a check box, or moves his or her focus to predetermined text), the marker selector 805 of the collaboration applet 320 detects the marker located nearest the pertinent object. Then, the message preparation unit 806 obtains the identifier of the detected marker to prepare a message, which it transits to the terminal device 11 through the data communication unit 807.

Upon the receipt of the message from the terminal device 12, the message analyzer 808 of the terminal device 11 analyzes the message, extracts the identifier for the marker that is the synchronization reference, and transmits the identifier to the marker position calculator 809. The marker position calculator 809 then calculates the position information of the marker designated by the identifier, and transmits the position information to the scroll controller 810. The scroll controller 810 scrolls the display in the window based on the position information for the marker received from the marker position calculator 809 and the position information for the center point 1021 obtained by the center point calculator 802, so that the marker is placed as close as possible to the center of the window (the display area 1020) of the web browser of the terminal device 11 (see JavaScript in FIG. 16).

Through the above operation, the object focused on by the terminal device 12 is displayed near the center of the window of the web browser of the terminal device 11. For the terminal devices 11 and 12 that perform the cooperative operation, when the display size of the window of the web browser and the font size differ greatly, the object displayed by one of the web browsers may not be displayed by the other web browser. In this case, even when this object is focused on by one web browser, so long as the pertinent object is not moved near the center of the window, the object can not be displayed in the other window merely by obtaining the above described periodical synchronization. Thus, when the user has focused on a predetermined object displayed by one web browser, the synchronization process is performed so that the object is displayed by another web browser.

FIGS. 12A and 12B are diagrams showing an example wherein the scrolling synchronization has been performed in accordance with the occurrence of an event. In FIG. 12A is shown a web browser at which an event occurred, and in FIG. 12B is shown a web browser that is operated in synchronization with the operation of the web browser in FIG. 12A. In FIGS. 12A and 12B, when the input form 1211 is clicked on by the web browser in FIG. 12A, the marker nearest the input form 1211 that is the object for which the event occurred is a marker object 1212 in the upper left corner of the input form 1211. The NAME attribute (identifier), which is written to the anchor tag that is the marker for this object, is transmitted to the web browser in FIG. 12B. In the web browser in FIG. 12B, a marker object 1222 in the upper left corner of an input form 1221 is designated based on the NAME attribute received from the web browser in FIG. 12A, and the marker object 1222 is moved to the location (a location exactly horizontal to the center point 1021) nearest the center point 1021 of the window of the web browser in FIG. 12B.

As is shown in FIG. 12A, at the terminal device 12 the object is not always displayed near the center of the window of the web browser. However, since it is apparent that the object is displayed in the window of the web browser for the terminal device 12, and that the user of the terminal device 12 is looking at the window, in order to support the cooperative operation, an effective response is for the object to be displayed near the center of the window of the web browser at the terminal device 11.

The remote pointer synchronization will now be described. For the remote pointer synchronization, the location of the remote pointer is relatively controlled, and is displayed in the window of the web browser while the location of the marker object is used as a reference. A remote pointer indicating the point in the web page that should be focused on for the cooperative operation is displayed in the window of the web browser by using a DIV tag and providing a GIF file. The display/non-display of the remote pointer (DIV object) can be selected by changing the VISIBILITY attribute value using JavaScript. And the location of the remote pointer (DIV object) can be moved by changing the LEFT and TOP attribute values using JavaScript. The JavaScript code and the event handler required for the synchronization can be embedded in the web page by the collaboration server 20. For the remote pointer synchronization, initially, the remote pointer DIV object is prepared as a non-display object for each of the terminals 11 and 12. For the preparation of the remote pointer, the function of the collaboration applet 320 is employed when, for example, the web page is loaded from the web collaboration server 20.

When a request for displaying the remote pointer is issued to the terminal device 12, the DIV object for the remote pointer is displayed in the window of the web browser of the terminal device 12. Then, a display start request is transmitted to the terminal device 11 by the data communication unit 807 of the collaboration applet 320. Upon the receipt of the display start request for the remote pointer, the collaboration applet 320 of the terminal device 11 displays, in the window of the web browser, the remote pointer DIV object that is operated by the terminal device 12. Thereafter, in the terminal device 12, the cursor position calculator 803 and the timer processor 804 of the collaboration applet 320 periodically obtain the position of the mouse cursor. The position of the mouse cursor can be obtained by using the onMouseMove event handler. The marker selector 805 searches for a marker located nearest the obtained position of the mouse cursor. When a marker different from the previously selected marker is found to be the marker nearest the position of the mouse cursor, the collaboration applet 320 moves, to the coordinates of the marker, the remote pointer DIV object that is displayed in the window of the web browser of the terminal device 12. Then, the message preparation unit 806 obtains the identifier for the newly detected marker (the NAME attribute of the anchor tag) and uses it to prepare a message it transmits to the terminal device 11 via the data communication unit 807.

Upon the receipt of the message from the terminal device 12, the message analyzer 808 of the terminal device 11 analyzes the message, extracts the identifier of the marker that is the synchronization reference, and transmits the identifier to the marker position calculator 809. The marker position calculator 809 calculates the position information for the marker specified by the identifier, and transmits the position information to the remote pointer drawing unit 811. Based on the marker position information received from the marker position calculator 809, the scroll controller 810 moves, to the coordinates for the marker, the DIV object for the remote pointer operated by the terminal device 12.

When a request is issued not to display the remote pointer at the terminal device 12, the DIV object for the remote pointer for the terminal device 12 is set to non-display, and the display end request is transmitted by the data communication unit 807 of the collaboration applet 320 to the terminal device 11. Upon the receipt of the remote pointer display end request, the collaboration applet 320 of the terminal device 11 changes, to a non-display, the DIV object for the remote pointer that is displayed in the window of the web browser and is operated by the terminal device 12.

Figure 13:
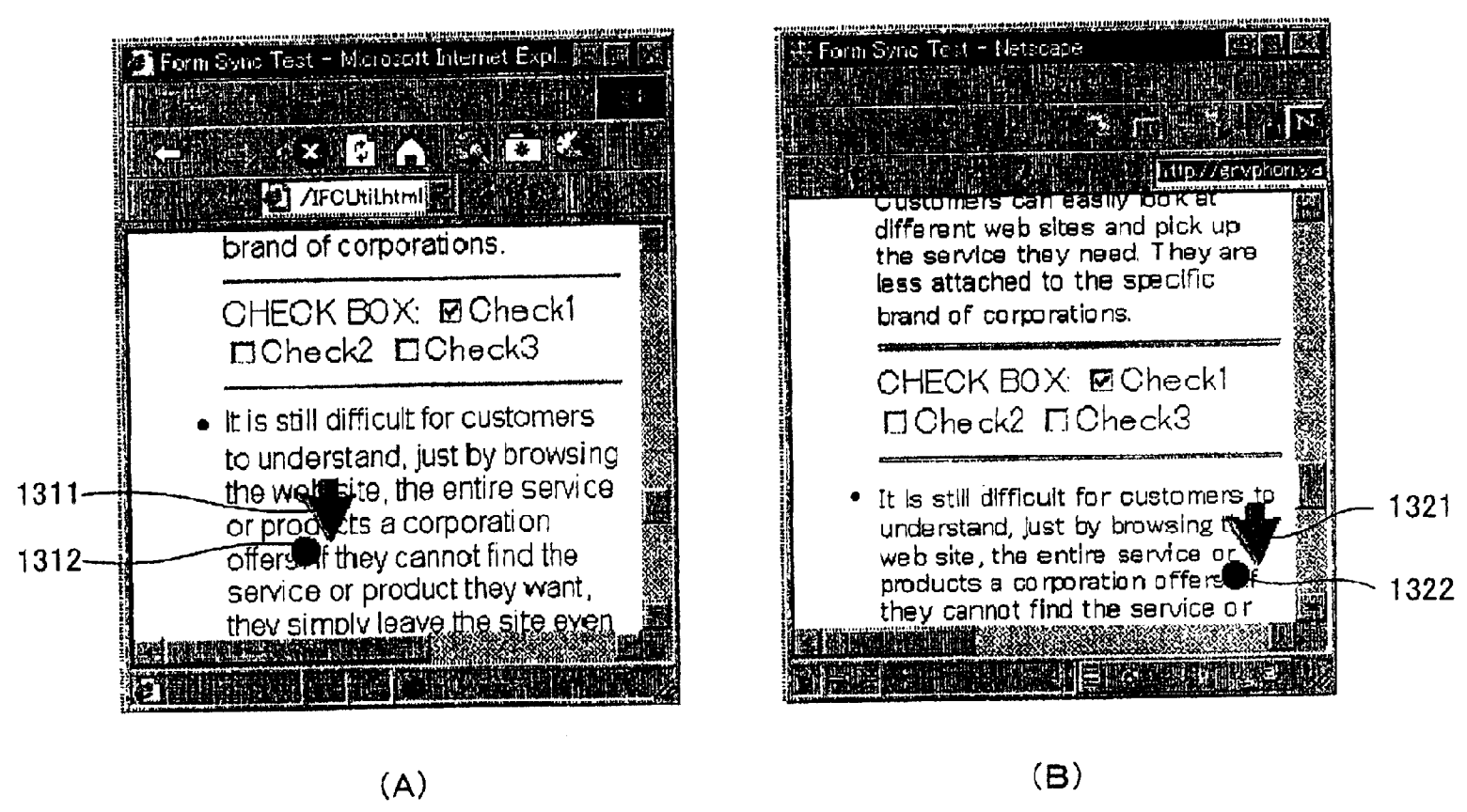

FIGS. 13A and 13B are diagrams showing a remote pointer synchronization example. In FIG. 13A a web browser is shown that has operated the remote pointer, and in FIG. 13B a web browser is shown that is operated in synchronization with the operation of the web browser in FIG. 13A. In FIGS. 13A and 13B, a DIV object 1311 for a remote pointer is displayed by the web browser in FIG. 13A at the coordinates of a marker object 1312 placed at the first position of a predetermined sentence (If they cannot . . . ). At this time, the NAME attribute (identifier), which is written to the anchor tag that is the marker for this object, is transmitted to the web browser in FIG. 13B. A corresponding marker object 1322 is designated by the web browser in FIG. 13B based on the NAME attribute received from the web browser in FIG. 13A, and the DIV object 1321 is moved to the coordinates. When the type and size of the font displayed in the window of the web browser differ, accordingly, the location of the marker object is moved. Therefore, as is shown in FIG. 13, the same positions in the content are indicated, although the display locations in the windows wherein the DIV object is indicated by the remote pointer are different.

In the above described embodiments, the anchor object is employed as a marker because it is preferable that the same coordinates be obtained for the position reference for the synchronization, even when the content is displayed by different web browsers, and that the layout of the content be deteriorated as little as possible.

However, so long as the objective of obtaining the same coordinates can be achieved, even when the content is displayed by different web browsers, a link object or an image object can be employed as a marker, instead of an anchor object.

Since the image object requires at least one dot for the minimum size of an object, no deterioration of the layout of the content is possible. Since the link object indicates that a link has been formed, the display of a portion wherein the object is positioned would be changed (for the default, the text is displayed in blue and is underlined). However, when an object having a satisfactory small size that does not greatly deteriorate the layout of the content is positioned, or when the display is so set that it is not greatly changed, these objects can be used as markers.

Advantages of the Invention

As is described above, according to the collaboration technique of the invention, the display scrolling and the locations of the remote pointers for the windows of the web browsers can be synchronized, regardless of the type of web browser or the setup that is used.

Furthermore, according to the invention, for the collaboration technique for downloading collaboration software to a terminal at the time of execution, the display scrolling and the locations of the remote pointers for the windows of the web browsers can be synchronized.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above.

The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An information processing system comprising:
   a support server connected to a web server via a network; and
   a plurality of terminal devices for obtaining a web content from said web server through said support server, and for performing a cooperative operation by using said web content,
   wherein each of said terminal devices includes
      display means for displaying said web content obtained through said support server,
      information provision means for obtaining identification information for an object that is selected as a synchronization reference from among objects in said web content, and for transmitting said identification information to a different terminal device that performs said cooperative operation, and
      synchronization means for calculating the location of a predetermined object in said web content, based on identification information that is received from a different terminal device for said predetermined object to be used as a synchronization reference, and for changing the display screen employed for said web content based on said location of the predetermined object;
   wherein the information provision means is operative: (i) to periodically detect a marker object located nearest a center point of a display area in the web content; (ii) to compare the new marker object to a previously detected marker object; (iii) when the new marker object is different from the previously detected marker object, to obtain identification information corresponding to the new marker object; and (iv) to transmit the identification information corresponding to the new marker object to the different terminal device; and
      wherein the synchronization means is operative: (i) to receive the identification information corresponding to the new marker object; and (ii) to reposition the display area based on the identification information corresponding to the new marker object.

2. The information processing system according to claim 1, wherein said information provision means selects, as said synchronization reference, said object that is located near the center of a window of web browser that displays web content; and wherein said synchronization means controls the display of said window, so that an object corresponding to the identification information transmitted by the different terminal device is located near the center of the window of web browser.

3. The information processing system according to claim 1, wherein, based on a predetermined event, said information provision means selects said object that serves as said synchronization reference; and said synchronization means controls the display of a window of web browser, so that an object corresponding to said identification information transmitted by said different terminal device is located near the center of said window.

4. The information processing system according to claim 1, wherein said information provision means selects, as said synchronization reference, the object that is located near a mouse cursor manipulated by a pointing device employed as input means; and wherein said synchronization means displays a pointer image used for a cooperative operation, at the location of an object that corresponds to the identification information received from the different terminal device.

5. An information processing system comprising:
a support server connected to a web server via a network; and
a plurality of terminal devices for obtaining a web content from said web server through said support server, and for performing a cooperative operation by using said web content,
wherein said support server further includes
storage means for storing a computer program that controls the operation of a terminal device when a cooperative operation is being performed,
wherein said terminal device includes
web content acquisition means for obtaining a target web content for the cooperative operation through said support server,
display means for displaying said web content obtained by said web content acquisition means,
reception means for obtaining said computer program from said support server in order to participate in the cooperative operation, and
cooperative operation means for performing a process required for said cooperative operation under the control of said computer program, and
wherein, based on position information within the web content for an object that is selected as said synchronization reference from among objects in web content displayed by said display means, said cooperative operation means obtains synchronization of display screens with a different terminal device;
wherein a first one of the terminal devices is operative: (i) to periodically detect a marker object located nearest a center point of a display area in the web content; (ii) to compare the new marker object to a previously detected marker object; (iii) when the new marker object is different from the preciously detected marker object, to obtain identification information corresponding to the new marker object; and (iv) to transmit the identification information corresponding to the new marker object to the different terminal device; and
wherein a second one of the terminal devices is operative: (i) to receive the identification information corresponding to the new marker object from the first terminal device; and (ii) to reposition the display area of the web content based on the identification information corresponding to the new marker object.

6. The information processing system according to claim 5, wherein said cooperative operation means controls the scrolling of said display screen of said display means so that said display screen is synchronized with the display screen of the display means of said different terminal device that performs a cooperative operation.

7. The information processing system according to claim 5, wherein said cooperative operation means displays a cooperative operation pointer image in web content displayed by said display means, and synchronizes the display location of said pointer image with said display screen of said display means of said different terminal device that performs a cooperative operation.

8. The information processing system according to claim 5, wherein said support server includes
storage means for holding said web content that is obtained from said web server as a target for a cooperative operation, and
process means for adding an object used as said synchronization reference to said web content stored in said storage means; and
wherein said web content acquisition means of said terminal device obtains, as a cooperative operation target, said web content to which said object has been added by said process means of said support server.

9. An information processing system, wherein a plurality of terminal devices are connected via a network and the display screens of display devices for said terminal devices are synchronized with each other, comprising:
a transmission side terminal device for, in response to an operation on said display screen of the display device, selecting a marker object as a synchronization reference from among objects in content displayed on said display screen of the display device, and for transmitting, to a different terminal device, identification information for said selected marker object; and
a reception side terminal device for controlling said display screen of the display device based on the location of an object that corresponds to said identification information received from the different terminal device;
wherein the transmission side terminal is operative: (i) to periodically detect a marker object located nearest a center point of a display area in the web content; (ii) to compare the new marker object to a previously detected marker object; (iii) when the new marker object is different from the preciously detected marker object, to obtain identification information for the new marker object; and (iv) to transmit the identification information corresponding to the new marker object to the different terminal device; and
wherein the reception side terminal is operative: (i) to receive the identification information corresponding to the new marker object; and (ii) to reposition the display area based on the identification information corresponding to the new marker object.

10. The information processing system according to claim 9, wherein said transmission side terminal device selects, as said marker object, the object located near the center of the display area for said content on said display device; and wherein said reception side terminal device controls the display screen, so that an object corresponding to said identification information transmitted by said transmission side terminal device is located near the center of the display area of the display device.

11. The information processing system according to claim 9, wherein said transmission side terminal device selects said marker object based on a predetermined event; and wherein said reception side terminal device controls the display screen, so that an object corresponding to said identification information received from said transmission side terminal device is located near the center of the display area of the display device.

12. The information processing system according to claim 9, wherein said transmission side terminal device selects, as said marker object, the object that is located near a mouse cursor manipulated by a pointing device employed as input means; and wherein said reception side terminal device displays a pointer image used for a cooperative operation, at the location of an object that corresponds to the identification information received from said reception side terminal device.

13. A terminal device comprising:
 a display unit for displaying predetermined content, said terminal device being connected to a different terminal device via a network and is synchronized with said different terminal device;
 a marker selector for selecting a marker object as a synchronization reference from among objects in the content displayed on the screen of said display unit, and for obtaining identification information for said marker object; and
 a data transmitter for transmitting, to the different terminal device, said identification information for said marker object obtained by said marker selector;
 wherein the terminal device is device is operative: (i) to periodically detect a marker object located nearest a center point of a display area of the predetermined content; (ii) to compare the new marker object to a preciously detected marker object; (iii) when the new marker object is different from the preciously detected marker object, to obtain identification information for the new marker object; and (iv) to transmit the identification information corresponding to the new marker object to the different terminal device.

14. The terminal device according to claim 13, wherein said marker selector selects, as said marker object, the object located near the center of the display area for the content on said display unit.

15. The terminal device according to claim 13, wherein said marker selector selects, as said marker object, the object located near a mouse cursor manipulated by a pointing device employed as input means.

16. A terminal device, which is connected to a different terminal device via a network and is synchronized with said different terminal device, comprising:
 a display unit for displaying a predetermined content;
 a data receiver for receiving identification information for a predetermined object in the content received from said different terminal device;
 a marker position calculator for calculating the location in said content of the object that corresponds to said identification information received by said data receiver; and
 a synchronization controller for controlling the screen of the display unit based on said location of the object obtained by said marker position calculator;
 wherein the different terminal device is operative: (i) to periodically detect a marker object located nearest a center point of a display area in predetermined content displayed on a display screen of the different terminal; (ii) to compare the new marker object to a preciously detected marker object; (iii) when the new marker object is different from the preciously detected marker object, to obtain identification information for the new marker object; and (iv) to transmit the identification information corresponding to the new marker object to the terminal device; and
 wherein the terminal device is operative: (i) to receive the identification information corresponding to the new marker object; and (ii) to reposition the screen of the display based on the identification information corresponding to the new marker object.

17. The terminal device according to claim 16, wherein, based on said location of the object obtained by said marker position calculator, said synchronization controller controls the display screen of said display unit, so that said object is located near the center of the display screen.

18. The terminal device according to claim 16, wherein said synchronization controller displays a pointer image used for a cooperative operation at the location of an object calculated by said marker position calculator.

19. A support server, which is connected to a web server and a plurality of terminal devices via a network, and which supports a cooperative operation among said terminal devices, comprising:
 web content acquisition means for obtaining a web content from said web server, upon the receipt of a request from said terminal device;
 process means for adding an object used as a synchronization reference for the cooperative operation to said web content; and
 communication means for returning to the terminal device said web content to which said object has been added;
 wherein the support server is operative: (i) to periodically detect a marker object located nearest a center point of a display area in the web content displayed on each of the plurality of terminal devices; (ii) to compare the new marker object to a previously detected marker object; (iii) when the new marker object is different from the previously detected marker object, to obtain identification information for the new marker object; and (iv) to transmit the identification information corresponding to the new marker object to the plurality of terminal devices for repositioning the respective display areas of the plurality of terminal devices so as to correspond to one another.

20. The support server according to claim 19, wherein said process means adds, as the object used as said synchronization reference, an HTML object whose coordinates in said web content can be obtained.

21. The support server according to claim 19, wherein said process means adds an anchor object as the object used as said synchronization reference.

22. A method for displaying the same web page on display devices of a plurality of terminal devices, and for synchronizing the display screens of said display devices, comprising the steps of:
 firstly permitting a predetermined terminal device to select an object that is used as a synchronization reference;
 secondly permitting said predetermined terminal device to transmit identification information for said selected object to a different terminal device; and
 thirdly permitting said different terminal device to control the display screen of the display device thereof based on the location of said object that corresponds to identification information received from said predetermined terminal device, and to synchronize the display screen thereof with said predetermined terminal device;

periodically detecting a marker object located nearest a center point of a display area in the web page displayed on the predetermined terminal device;

comparing the new marker object to a previously detected marker object;

when the new marker object is different from the previously detected marker object, obtaining identification information for the new marker object;

transmitting the identification information corresponding to the new marker object to the different terminal device;

the different terminal device receiving the identification information corresponding to the new marker object; and repositioning a display area of the different terminal device based on the identification information corresponding to the new marker object.

23. The information processing method according to claim 22, wherein said firstly permitting step permits the predetermined terminal device:

to obtain the location of the center of a window of a web browser that displays a web content; and to select, as said synchronization reference, the object located near said center, and wherein said thirdly permitting step permits the different terminal device:

to calculate the location of an object corresponding to said identification information; and to control the display screen of the display device based on the location of the object, so that said object is located near the center of the display screen.

24. The information processing method according to claim 22, wherein said firstly permitting step permits the predetermined terminal device:

to obtain position information for a mouse cursor manipulated by a pointing device used as input means; and to employ said position information for said mouse cursor to select, as said synchronization reference, said object located near the mouse cursor, and wherein said thirdly permitting step permits the different terminal device:

to calculate the location of an object corresponding to said identification information; and to display a cooperative operation pointer image at the location of said object.

25. A tangible storage medium on which a computer-readable program is stored, which permits said computer to perform:

a process for receiving, from a predetermined terminal device, identification information for specifying an object on a web page displayed by a display device of said computer;

a process for calculating the location, on said web page, of an object that corresponds to said received identification information; and a process for controlling the display screen of said display device based on the obtained location of said object, and for synchronizing said display screen with the display screen of the display device of said predetermined terminal device that has transmitted said identification information;

wherein the process for controlling the display screen of said display device comprises:

periodically detecting a marker object located nearest a center point of a display area in the web page displayed on the predetermined terminal device;

comparing the new marker object to a previously detected marker object;

when the new marker object is different from the previously detected marker object, obtaining identification information for the new marker object;

transmitting the identification information corresponding to the new marker object to the different terminal device;

the different terminal device receiving the identification information corresponding to the new marker object; and repositioning a display area of the different terminal device based on the identification information corresponding to the new marker object.

26. A tangible computer program product comprising a computer usable medium having computer readable program code means embodied therein for causing an information processing system, the computer readable program code means in said computer program product comprising computer readable program code means for causing a computer to effect the functions of claim 1.

27. A tangible computer program product comprising a computer usable medium having computer readable program code means embodied therein for causing a terminal device, the computer readable program code means in said computer program product comprising computer readable program code means for causing a computer to effect the functions of claim 13.

28. A tangible computer program product comprising a computer usable medium having computer readable program code means embodied therein for causing a support server, the computer readable program code means in said computer program product comprising computer readable program code means for causing a computer to effect the functions of claim 19.

29. An article of manufacture comprising a computer usable medium having computer readable program code means embodied therein for causing a display, the computer readable program code means in said article of manufacture comprising computer readable program code means for causing a computer to effect the steps of claim 22.

30. A program storage device readable by machine, tangibly embodying a program of instructions executable by the machine to perform method steps for displaying the same web page on display devices of a plurality of terminal devices, and for synchronizing the display screens of said display devices, said method steps comprising the steps of claim 22.

* * * * *

UNITED STATES PATENT AND TRADEMARK OFFICE
CERTIFICATE OF CORRECTION

PATENT NO. : 6,938,212 B2
DATED : August 30, 2005
INVENTOR(S) : Kohichi Nakamura It is certified that error appears in the above-identified patent and that said Letters Patent is hereby corrected as shown below:

<u>Title page,</u>
Item [75], Inventor, "Machida" and insert -- Tokyo-to --.

<u>Column 19,</u>
Line 57, delete "preciously" and insert -- previously --.

<u>Column 20,</u>
Line 47, delete "preciously" and insert -- previously --.

<u>Column 21,</u>
Lines 33, 34 and 66, delete "preciously" and insert -- previously --.

<u>Column 22,</u>
Line 1, delete "preciously" and insert -- previously --.

Signed and Sealed this

First Day of November, 2005

JON W. DUDAS
*Director of the United States Patent and Trademark Office*